(12) United States Patent
Baugh (10) Patent No.: US 9,335,753 B2
(45) Date of Patent: May 10, 2016

(54) ARCHITECTURAL OPENING COVERINGS AND METHODS

(75) Inventor: James Baugh, Denver, CO (US)

(73) Assignee: HUNTER DOUGLAS INC., Pearl River, NY (US)

( * ) Notice: Subject to any disclaimer, the term of this patent is extended or adjusted under 35 U.S.C. 154(b) by 947 days.

(21) Appl. No.: 13/367,000

(22) Filed: Feb. 6, 2012

(65) Prior Publication Data

US 2012/0200247 A1 Aug. 9, 2012

Related U.S. Application Data

(60) Provisional application No. 61/440,359, filed on Feb. 7, 2011.

(51) Int. Cl.
*H04Q 9/00* (2006.01)
*H02P 3/00* (2006.01)
*G05B 19/042* (2006.01)

(52) U.S. Cl.
CPC ...... *G05B 19/042* (2013.01); *G05B 2219/2653* (2013.01)

(58) Field of Classification Search
CPC ............... E05Y 2900/106; E05Y 2900/55; E05F 15/1607; H02H 7/0851; B60J 7/0573
USPC .................................................. 318/16, 468
See application file for complete search history.

(56) References Cited

U.S. PATENT DOCUMENTS

| 4,673,018 A | 6/1987 | Judkins |
| 4,687,038 A | 8/1987 | Clemente |
| 4,712,104 A | 12/1987 | Kobayashi |
| 4,762,159 A | 8/1988 | Ford |
| 4,813,468 A | 3/1989 | Fraser |
| 4,842,034 A | 6/1989 | Haines |
| 4,850,414 A | 7/1989 | Lessard |
| 5,598,000 A | 1/1997 | Popat |
| 5,663,621 A | 9/1997 | Popat |
| 5,675,487 A | 10/1997 | Patterson et al. |
| 5,791,390 A * | 8/1998 | Watanabe ............... E06B 9/262 160/115 |
| 5,793,174 A | 8/1998 | Kovach et al. |
| 5,860,464 A | 1/1999 | Schon |
| 6,082,433 A | 7/2000 | Vafaie et al. |
| 6,181,089 B1 * | 1/2001 | Kovach et al. .................. 318/16 |
| 6,186,211 B1 * | 2/2001 | Knowles ............... B60J 1/2011 160/84.02 |

(Continued)

OTHER PUBLICATIONS

Patent Cooperation Treaty, "International Preliminary Report on Patentability," Issued in connection with International Application No. PCT/US2012/023981, on Aug. 13, 2013, 7 pages.

(Continued)

*Primary Examiner* — Bentsu Ro
*Assistant Examiner* — Gabriel Agared
(74) *Attorney, Agent, or Firm* — Hanley, Flight & Zimmerman, LLC (57) ABSTRACT

Example architectural opening coverings and methods are disclosed. An example architectural opening covering system comprises a first motor to move a middle rail relative to a fixed top rail, and a second motor to move a bottom rail relative to the middle rail and the fixed top rail. The example system also comprises a controller to selectively actuate the first motor to move the middle rail based on a first position of the middle rail and a first position of the bottom rail, and to selectively actuate the second motor to move the bottom rail based on a second position of the middle rail and a second position of the bottom rail.

20 Claims, 9 Drawing Sheets

(56) References Cited

U.S. PATENT DOCUMENTS

| | | | |
|---|---|---|---|
| 6,196,292 B1 | 3/2001 | Jackson | |
| 6,460,805 B1 * | 10/2002 | Sanz | B64C 1/1492 160/88 |
| 6,758,255 B2 * | 7/2004 | Sanz | B64C 1/1484 160/107 |
| 7,028,737 B2 | 4/2006 | Hsu | |
| 7,264,034 B2 * | 9/2007 | Lin | E06B 9/32 160/168.1 P |
| 7,466,090 B2 | 12/2008 | Meewis et al. | |
| 7,740,045 B2 | 6/2010 | Anderson et al. | |
| 7,832,450 B2 * | 11/2010 | Brace et al. | 160/84.05 |
| 2006/0162874 A1 * | 7/2006 | Lin | 160/168.1 P |
| 2009/0025888 A1 | 1/2009 | Brace et al. | |
| 2009/0173456 A1 * | 7/2009 | Rodas et al. | 160/168.1 P |
| 2009/0242332 A1 * | 10/2009 | Anderson | E06B 9/262 185/37 |
| 2010/0109850 A1 | 5/2010 | Kovach et al. | |
| 2012/0267060 A1 * | 10/2012 | Anderson | E06B 9/262 160/241 |
| 2013/0075045 A1 * | 3/2013 | Lin | E06B 9/322 160/84.04 |

OTHER PUBLICATIONS

Patent Cooperation Treaty, "International Search Report," issued by the International Searching Authority in connection with PCT application No. PCT/US2012/023981, mailed May 23, 2012, (2 pages).

Patent Cooperation Treaty, "Written Opinion of the International Searching Authority," issued by the International Searching Authority in connection with PCT/US2012/023981, mailed May 23, 2012, (6 pages).

* cited by examiner

LOWER-LIMIT DETECTION ASSEMBLY
FIG. 3

ARCHITECTURAL OPENING COVERINGS AND METHODS

RELATED APPLICATIONS

This patent claims priority to U.S. Provisional Patent Application No. 61/440,359, filed on Feb. 7, 2011, which is hereby incorporated herein by reference in its entirety.

FIELD OF THE DISCLOSURE

The present disclosure relates generally to architectural opening coverings and, more particularly, to architectural opening coverings and methods.

BACKGROUND

Architectural opening covering assemblies (e.g., blinds, shades, shutters, etc) of different types are known. In some such covering assemblies, a flexible material such as fabric is used as the covering. A drive mechanism enables a user to extend and retract the fabric relative to an opening such as a window.

DETAILED DESCRIPTION

Example methods, apparatus, and articles of manufacture disclosed herein may be used to implement architectural opening coverings. Such architectural opening coverings may be used to cover windows, doors, or other openings in architectural structures using top down/bottom up configurations having extending and retracting coverings (e.g., blinds, shades, etc.) structures. In example top down/bottom up configurations, a top rail is fixedly mounted at an upper portion of an architectural opening and is operably coupled to moveable middle and bottom rails. A covering (e.g., a blind, a shade, a web, a fabric, etc.) is connected between the moveable middle and bottom rails so that as the middle and bottom rails move toward and away from one another, the covering extends to cover an architectural opening and retracts to expose the architectural opening. The moveability of the middle and bottom rails enables selectively covering of upper, middle, or bottom portions of an architectural opening using the covering.

Example top down/bottom up architectural opening covering systems disclosed herein are provided with one or more motor assemblies to move the middle and bottom rails. Such example systems also include one or more controllers to implement example processes that detect positions of the moveable middle and bottom rails and enable movements thereof based on the detected positions. In this manner, control of such example architectural opening covering systems by users becomes simple and intuitive without requiring the users to determine when to select the middle rail for movement and when to select the bottom rail for movement. That is, a control interface (e.g., buttons) on an example architectural opening covering system or on an example remote control for the example architectural opening covering system can be implemented using one 'up' button and one 'down' button. In this manner, a user need only select either the 'up' button or the 'down' button, and the controller(s) in the example architectural opening covering system will automatically determine the appropriate one of the moveable middle or bottom rails to move based on the detected positions of those rails. For example, if a user presses the 'down' button when the bottom rail is detected as being at a completely down position and the middle rail is detected as being at a completely up position or an intermediate position, an example controller of an example architectural opening covering system disclosed herein causes the middle rail to move down, while keeping the bottom rail stationary because the bottom rail cannot move down any further. In some examples, when the middle rail is detected as being at the completely up position, and the user presses and holds the 'down' button for an extended duration, the example controller causes the middle rail to bypass the intermediate position and move to a completely down position. If the user presses the 'up' button when the bottom rail is detected as being at a completely down position or at an intermediate position and the middle rail is detected as being at a completely up position, the example controller causes the bottom rail to move up, while keeping the middle rail stationary because the middle rail cannot move up any further. In some examples, when the middle rail is detected as being at the completely down position, and the user presses and holds the 'up' button for an extended duration, the example controller causes the middle rail to bypass the intermediate position and move to a completely up position.

Example methods, apparatus, and articles of manufacture disclosed herein use one or more control algorithm(s) that set upper and lower threshold positions for each of the middle rail and the bottom rail and sense the positions of the middle rail and the bottom rail during operation. The control algorithm(s) compare(s) the sensed positions of the middle rail and the lower rail to respective upper and lower threshold positions and use such comparisons to prevent operation of the middle rail when the bottom rail is in a position that would cause the operation of the middle rail to fail or to be unsatisfactory. Such comparisons are also used to prevent operation of the bottom rail when the middle rail is in a position that would cause the operation of the bottom rail to fail or to be unsatisfactory.

In some examples, electrical connections between control circuitry and one or two motors in the top rail are implemented using flat ribbon cable. A flat ribbon cable facilitates assembly and placement of components (e.g., motor(s), controller board(s), battery(ies), wires, etc.) within a limited amount of space in the middle and bottom rails.

Figure 1:
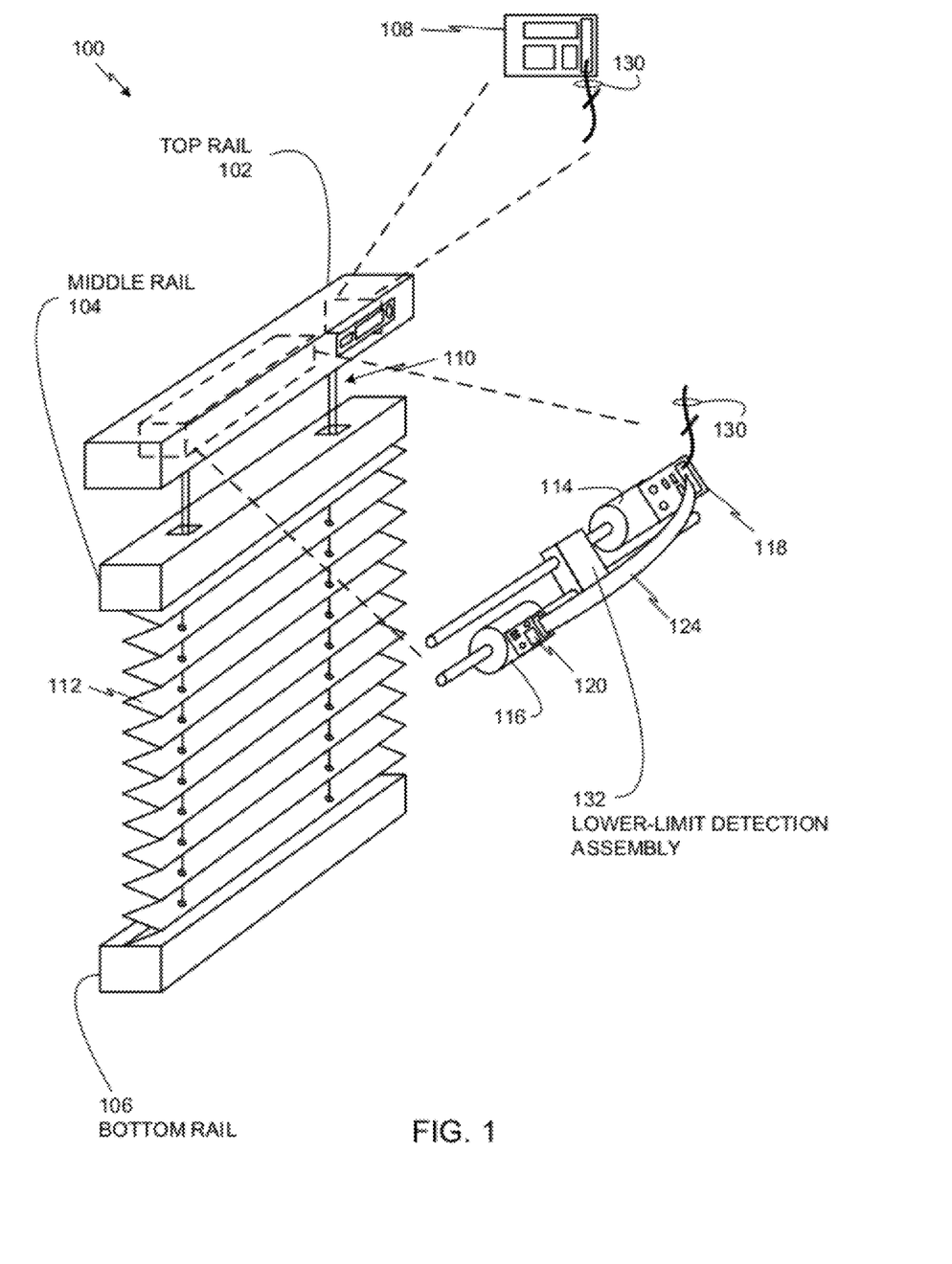
FIG. 1 depicts an example architectural opening covering.
Figure 2:
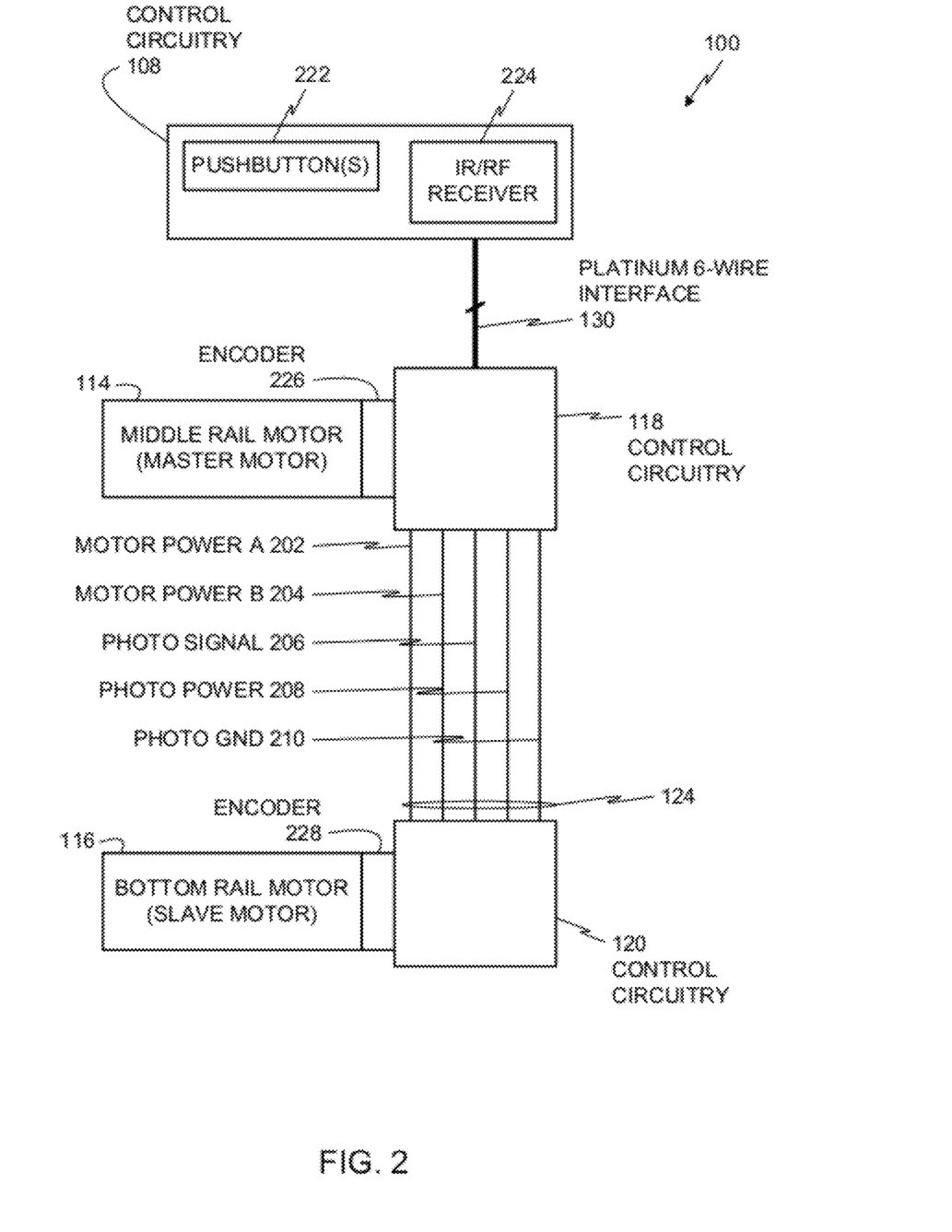
FIG. 2 is a block diagram of the example architectural opening covering of FIG. 1.

FIG. 1 depicts an example architectural opening covering system 100 shown as a top down/bottom up architectural opening covering system 100. FIG. 2 is a block diagram of the example architectural opening covering system 100. The example architectural opening covering system 100 is mountable at an architectural opening (not shown) to allow the covering to be drawn up and/or down relative to the architectural opening's lower and upper portions. As shown in FIGS. 1 and 2, the architectural opening covering system 100 includes a top rail 102, a middle rail 104, and a bottom rail 106. The top rail 102 is a fixed rail and the middle rail 104 and the bottom rail 106 are moveable. In the illustrated example, the top rail 102 is fixedly mounted to a wall or framing (not shown) surrounding an architectural opening (not shown). The top rail 102 stores control circuitry 108 (e.g., a user-input receiver controller) to control actuations of the middle rail 104 and the bottom rail 106 to expose less or more of the top and/or bottom portions of an architectural opening.

As shown in the illustrated example of FIG. 1, the middle rail 104 and the bottom rail 106 are connected through lift cords 110 to the top rail 102. The lift cords 110 enable lowering and raising the middle rail 104 and the bottom rail 106. In operation, the middle rail 104 is moveable independent of the bottom rail 106 relative to the top rail 102, and the bottom rail 106 is moveable independent of the middle rail 104 relative to the top rail 102. In this manner, a covering 112 (e.g., a shade, a fabric, a blind, etc.) disposed between the middle rail 104 and the bottom rail 106 can be raised from the bottom towards the top by selectively and independently moving the bottom rail 106. The covering 112 can also be lowered from the top towards the bottom by selectively and independently moving the middle rail 104. Selectively moving the middle rail 104 and the bottom rail 106 relative to one another in this manner causes the covering 112 to extend and retract over different portions of a corresponding architectural opening to expose less or more of the architectural opening.

In the illustrated example of FIG. 1, a middle rail motor 114 (or master motor 114) is provided to enable moving the middle rail 104 and a bottom rail motor 116 (or slave motor 116) is provided to enable moving the bottom rail 106. The middle rail motor 114 and the bottom rail motor 116 of the illustrated example are implemented using reversible permanent magnet direct current (DC) geared motors. However, any other suitable type of motor(s) may be used. In the illustrated example, the middle rail motor 114 is configured as a master motor and the bottom rail motor is configured as a slave motor as shown in FIG. 2. Although the architectural opening covering system 100 of the illustrated example is shown with two motors, in other examples, the architectural opening covering system 100 may be implemented using only one motor to move both of the middle rail 104 and to bottom rail 106.

As shown in FIG. 1, the master motor 114 and control circuitry 118 are located in the top rail 102, and the slave motor 116 and control circuitry 120 are also located in the top rail 102. In the illustrated example, the control circuitry 118 is mounted to the master motor 114 and is electrically connected to the master motor 114 using electrical pads, connectors, vias, etc. of a printed circuit board having the control circuitry 118. As shown in the illustrated example of FIG. 1, the control circuitry 108 is in communication with the control circuitry 118 via electrical conductors 130. The electrical conductors 130 of the illustrated example have six conductors and implement a platinum 6-wire interface as noted in FIG. 2. In the illustrated example, the control circuitry 120 is mounted to the slave motor 116 and is electrically connected to the slave motor 116 using electrical pads, connectors, vias, etc. of a printed circuit board having the control circuitry 120.

In the illustrated example, the control circuitry 118 is connected to the control circuitry 120 using a ribbon cable 124 that is cut to size at the time of fabrication or manufacturing (or pre-cut prior to fabrication or manufacturing) to fit within the top rail 102 without too much slack. The flat characteristic of the ribbon cable 124 and its cut-to-size fit are advantageously used in the illustrated example to enable fitting the master motor 114, the slave motor 116, and any other components within a limited-size compartment or space provided inside the top rail 102.

Although the control circuitry 108, 118, and 120 are shown in the example of FIG. 1 as located on single, respective circuit boards, the control circuitry 108, 118, and 120 may be implemented using different configurations. For example, the control circuitry 108 may be located throughout the top rail 102 on two or more circuit boards and/or as one or more discrete components, the control circuitry 118 may be located throughout the top rail 102 on two or more circuit boards and/or as one or more discrete components, and/or the control circuitry 120 may be located throughout the top rail 102 on two or more circuit boards and/or as one or more discrete components. Further details describing example configurations of the control circuitry 108, 118, and 120 are provided below in connection with FIGS. 2, 4A, 4B, 5, 6A, and 6B.

Figure 3:
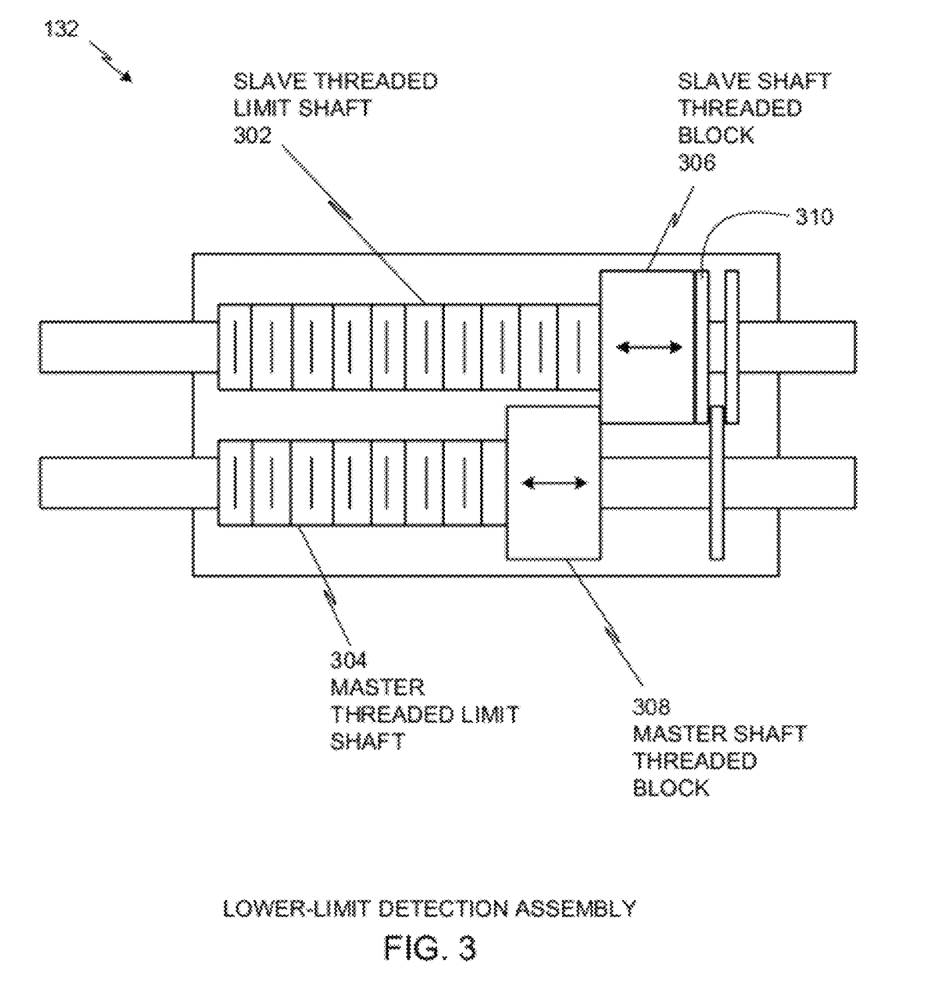
FIG. 3 is a detailed view of a lower-limit detection assembly which may be used in the example architectural opening covering of FIGS. 1 and 2 to detect end-of-travel positions of middle and bottom rails of the architectural opening covering.

In the illustrated example of FIG. 1, a lower-limit detection assembly 132 is shown operatively coupled to respective shafts of the master motor 114 and the slave motor 116. The lower-limit detection assembly 132 enables detecting when the middle rail 104 reaches a maximum or completely down position (e.g., a position in which the middle rail 104 is as far away as desired from (e.g., at a maximum distal position from) the top rail 102 and/or is in abutment with the bottom rail 106) and enables detecting when the bottom rail 106 reaches a maximum or completely down position (e.g., a position in which it is as far away as desired from (e.g., at a maximum distal position from) the top rail 102). Referring to FIG. 3, the example lower-limit detection assembly 132 includes a slave threaded limit shaft 302 coupled to a shaft of the slave motor 116 and a master threaded limit shaft 304 coupled to a shaft of the master motor 114. In addition, a slave shaft threaded block 306 is threadably coupled to the slave threaded limit shaft 302 and a master shaft threaded block 308 is threadably coupled to the master threaded limit shaft 304. As the slave motor 116 rotates its shaft to lower the bottom rail 106, the slave threaded limit shaft 302 rotates, causing the slave shaft threaded block 306 to traverse the length of the slave threaded limit shaft 302 until the slave shaft threaded block 306 abuts a stop 310. When the slave shaft threaded block 306 abuts the stop 310, the bottom rail 106 has reached its maximum downward position or completely down and cannot move down any further. As the master motor 114 rotates its shaft to lower the middle rail 104, the master threaded limit shaft 304 rotates, causing the master shaft threaded block 308 to traverse the length of the master threaded limit shaft 304 toward the slave shaft threaded block 306 until the master shaft threaded block 308 abuts the slave shaft threaded block 306. When the master shaft threaded block 306 abuts the slave shaft threaded block 306, the middle rail 104 is in abutment with the bottom rail 106 and cannot move down any further.

Referring to the illustrated example of FIG. 2, select signals of the ribbon cable 124 between the control circuitry 118 and the control circuitry 120 are shown. In particular, the ribbon cable 124 of the illustrated example includes a motor power A conductor 202 and a motor power B conductor 204 that provide electrical power to the slave motor 116. The example ribbon cable 124 also includes a photo signal conductor 206, a photo power conductor 208, and a photo ground conductor 210 to provide power to and receive signals from an optical rotary encoder 226 coupled to the slave motor 116.

Referring to FIG. 2, the top rail 102 of the illustrated example is shown as having a pushbuttons interface 222 having one or more user-selectable (e.g., pushable, depressable, etc.) button(s) (not shown) to control upward and downward movements of the middle rail 104 and the bottom rail 106. In addition, the top rail 102 is provided with an infrared (IR) and/or radio frequency (RF) receiver 224 to receive signals from a user-operable remote control indicative of 'up' and 'down' commands from a remote location to cause movement of the middle rail 104 and the bottom rail 106. In some examples, pressing one or more buttons on the pushbuttons interface 222 initiates selection of a radio frequency group setting to pair a remote control with the infrared (IR) and/or radio frequency (RF) receiver 224. For example, a user may press one or more buttons on the pushbuttons interface 222 and a corresponding button sequence on a remote control to pair the remote control for use with the infrared (IR) and/or radio frequency (RF) receiver 224 to control movement of the middle rail 104 and the bottom rail 106.

In the illustrated example of FIG. 2, the master motor 114 is provided with a rotary encoder 226 operatively coupled thereto and the slave motor 116 is provided with an optical rotary encoder 228 operatively coupled thereto. In such examples, the rotary encoder 226 is configured to track rotations and/or rotational positions of the master motor 114 and the rotary encoder 228 is configured to track rotations and/or rotational positions of the slave motor 116. The encoder readings provided by the rotary encoders 226 and 228 are used by the architectural opening covering system 100 to determine positions of the middle rail 104 and the bottom rail 106.

In the illustrated example, control logic associates encoder readings from the encoders 226 and 228 with maximum upward positions and/or maximum downward positions of the middle rail 104 and the bottom rail 106 based on an initial calibration process of the architectural opening covering system 100 when first installed at a corresponding architectural opening. An example calibration process involves sensing or measuring electrical currents (e.g., amperage) drawn by the motors 114 and 116 as the middle rail 104 and the bottom rail 106 cycle through upward and/or downward movements relative to one another and relative to the top rail 102 during the calibration process.

During the calibration process, when the middle rail 104 reaches a maximum up or completely up position (e.g., a position in which it is in abutment with the top rail 102), the master motor 114 begins to stall because, although powered, the middle rail 104 can no longer move upward due to, for example, its abutment with the top rail 102. As the master motor 114 stalls, it draws an increased amount of current (e.g., a current overage). A processor or controller (e.g., a controller of a controller circuit 606 of FIG. 6A) of the architectural opening covering system 100 measures the current and, when it detects that the current has surpassed or exceeded a threshold (e.g., an electrical current value beyond the normal operating current or rated current of the master motor 114), the processor or controller collects a corresponding rotary encoder reading from the rotary encoder 226. The processor or controller then stores the collected rotary encoder reading as a maximum upward travel encoder reading indicative of a maximum upward position of the middle rail 104. In this manner, the processor or controller can subsequently use the maximum upward travel encoder reading as a reference (to compare with readings of the rotary encoder 226) by which to determine when to cut power or disable the master motor 114 from causing further upward movement of the middle rail 104.

Also during the calibration process, when the bottom rail 106 reaches a maximum up or completely up position (e.g., a position in which it is in abutment with the middle rail 104), the slave motor 116 begins to stall because, although powered, the bottom rail 106 can no longer move upward due to, for example, its abutment with the middle rail 104. As the slave motor 116 stalls, it draws an increased amount of current (e.g., a current overage). A processor or controller (e.g., a controller of a controller circuit 606 of FIG. 6A) of the architectural opening covering system 100 measures the current and, when it detects that the current has surpassed or exceeded a threshold (e.g., an electrical current value beyond the normal operating current or rated current of the slave motor 116), the processor or controller collects a corresponding rotary encoder reading from the rotary encoder 228. The processor or controller then stores the collected rotary encoder reading as a maximum upward travel encoder reading indicative of a maximum upward position of the bottom rail 106. In this manner, the processor or controller can subsequently use the maximum upward travel encoder reading as a reference (to compare with readings of the rotary encoder 228) by which to determine when to cut power or disable the slave motor 116 from causing further upward movement of the bottom rail 106.

In the illustrated example, maximum or completely downward positions of the middle rail 104 and the bottom rail 106 are determined based on detecting stalling points (e.g., maximum current draws of the motors 114 and 116) of the motors 114 and 116 based on when the slave shaft threaded block 306 abuts the stop 310 and/or when the master shaft threaded block 308 abuts the slave shaft threaded block 306. For example, when the bottom rail 106 reaches a maximum or completely down position (e.g., a position in which it is as far away as desired from (e.g., at a maximum distal position from) the top rail 102), the slave motor 116 begins to stall because, although powered, the bottom rail 106 can no longer move downward due to, for example, the slave shaft threaded block 306 being in abutment with the stop 310 as shown in FIG. 3. As the slave motor 116 stalls, it draws an increased amount of current (e.g., a current overage). The processor or controller of the architectural opening covering system 100 measures the current and, when it detects that the current has surpassed or exceeded a threshold (e.g., an electrical current value beyond the normal operating current or rated current of the slave motor 116), the processor or controller cuts power to or disables the slave motor 116 from causing further downward movement of the bottom rail 106. Similarly, when the middle rail 104 reaches a maximum or completely down position (e.g., a position in which it is as far away as desired from (e.g., at a maximum distal position from) the top rail 102 and is in abutment with the bottom rail 106), the master motor 114 begins to stall because, although powered, the middle rail 104 can no longer move downward due to, for example, the master shaft threaded block 308 being in abutment with the slave shaft threaded block 306 as shown in FIG. 3. As the master motor 114 stalls, it draws an increased amount of current (e.g., a current overage). The processor or controller of the architectural opening covering system 100 measures the current and, when it detects that the current has surpassed or exceeded a threshold (e.g., an electrical current value beyond the normal operating current or rated current of the master motor 114), the processor or controller cuts power to or disables the master motor 114 from causing further downward movement of the middle rail 104.

In other examples, encoder readings from the rotary encoders 226 and 228 may be used to determine maximum or completely down positions of the middle rail 104 and the bottom rail 106. For example, during a calibration process of such examples, when the bottom rail 106 reaches a maximum or completely down position (e.g., a position in which it is as far away as desired from (e.g., at a maximum distal position from) the top rail 102), the slave motor 116 begins to stall because, although powered, the bottom rail 106 can no longer move downward due to, for example, the slave shaft threaded block 306 being in abutment with the stop 310 as shown in FIG. 3. As the slave motor 116 stalls, it draws an increased amount of current (e.g., a current overage). The processor or controller of the architectural opening covering system 100 measures the current and, when it detects that the current has surpassed or exceeded a threshold (e.g., an electrical current value beyond the normal operating current or rated current of the slave motor 116), the processor or controller collects a corresponding rotary encoder reading from the rotary encoder 228. The processor or controller then stores the collected rotary encoder reading as a maximum downward travel encoder reading indicative of a maximum downward position of the bottom rail 106. In this manner, the processor or controller can subsequently use the maximum downward travel encoder reading as a reference (to compare with readings of the rotary encoder 228) by which to determine when to cut power or disable the slave motor 116 from causing further downward movement of the bottom rail 106.

Also during the calibration process of some examples, when the middle rail 104 reaches a maximum or completely down position (e.g., a position in which it is as far away as desired from (e.g., at a maximum distal position from) the top rail 102 and is in abutment with the bottom rail 106), the master motor 114 begins to stall because, although powered, the middle rail 104 can no longer move downward due to, for example, the master shaft threaded block 308 being in abutment with the slave shaft threaded block 306 as shown in FIG. 3. As the master motor 114 stalls, it draws an increased amount of current (e.g., a current overage). The processor or controller of the architectural opening covering system 100 measures the current and, when it detects that the current has surpassed or exceeded a threshold (e.g., an electrical current value beyond the normal operating current or rated current of the master motor 114), the processor or controller collects a corresponding rotary encoder reading from the rotary encoder 226. The processor or controller then stores the collected rotary encoder reading as a maximum downward travel encoder reading indicative of a maximum downward position of the middle rail 104. In this manner, the processor or controller can subsequently use the maximum downward travel encoder reading as a reference (to compare with readings of the rotary encoder 226) by which to determine when to cut power or disable the master motor 114 from causing further downward movement of the middle rail 104.

Figure 4A:
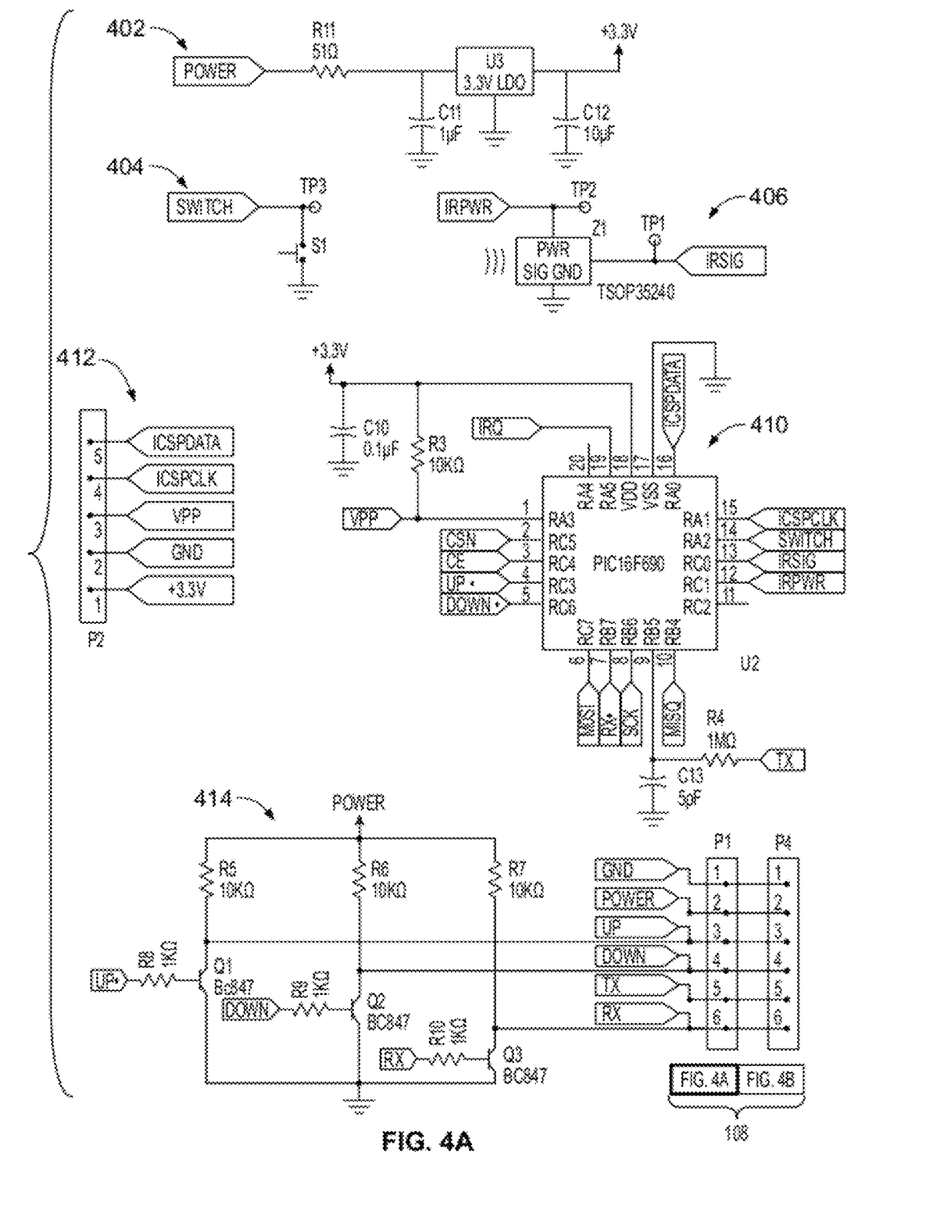
FIGS. 4A and 4B is a schematic diagram of example electrical circuitry that may be used to implement a user-input receiver of the example architectural opening covering of FIGS. 1 and 2.
Figure 4B:
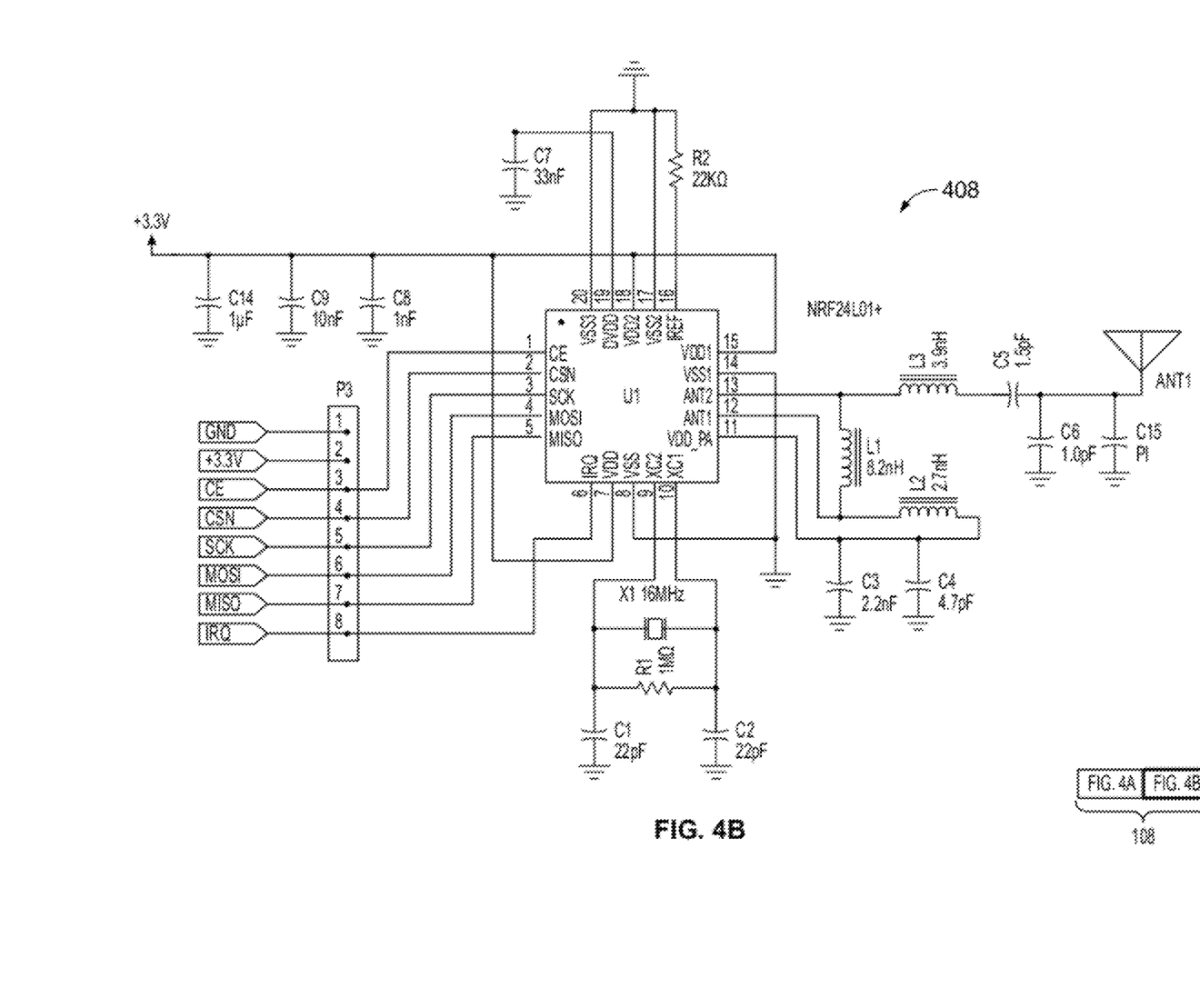

FIGS. 4A and 4B is a schematic diagram of example electrical circuitry (e.g., the control circuitry 108 of FIGS. 1 and 2) that may be used to implement a user-input receiver of the example architectural opening covering system 100 of FIGS. 1 and 2. In the illustrated example, the control circuitry 108 includes an example power regulator circuit 402, an example pushbutton switch circuit 404, an example infrared (IR) receiver circuit 406, an example radio frequency (RF) receiver circuit 408 (FIG. 4B), an example controller circuit 410, an example programming header 412, and an example interconnect 414. In the illustrated example, the power regulator 402 regulates and provides electrical power (e.g., +3.3 volts) to the control circuitry 108. The pushbutton switch circuit 404 of the illustrated example provides one or more user interface pushbutton(s) (e.g., of the pushbutton(s) 222 of FIG. 2) to control upward and downward movements of the middle rail 104 and the bottom rail 106 of FIGS. 1 and 2 and/or to initiate a calibration routine of the architectural opening covering system 100.

The IR receiver circuit 406 of the illustrated example enables the architectural opening covering system 100 to receive infrared signals from remote controls operable by users to cause upward and/or downward movements of the middle rail 104 and the lower rail 106.

The RF receiver circuit 408 (FIG. 4B) of the illustrated example enables the architectural opening covering system 100 to receive RF signals from remote controls operable by users to cause upward and/or downward movements of the middle rail 104 and the lower rail 106. In some examples, the IR receiver circuit 406 may be omitted and the architectural opening covering system 100 is operable using RF remote controls. Alternatively, the RF receiver circuit 408 may be omitted and/or the architectural opening covering system 100 may be operable using IR remote controls. In other examples, both of the IR receiver circuit 406 and the RF receiver circuit 408 may be provided so that the architectural opening covering system 100 is operable using either IR or RF remote controls. In yet other examples, both of the IR receiver circuit 406 and the RF receiver circuit 408 may be omitted and the architectural opening covering system 100 is then operable using the one or more pushbuttons 222 located at the top rail 102 as shown in FIG. 2. In the illustrated example, the RF receiver circuit 408 is implemented using part number nRF24L01 manufactured and sold by Nordic Semiconductor of Trondheim and Oslo, Norway. However, any other suitable type of RF receiver may be used.

In the illustrated example, the controller circuit 410 is provided to implement one or more control algorithms or processes to control the operations of the architectural opening covering system 100. In the illustrated example, the controller circuit 410 is implemented using a PIC in-circuit programmable microcontroller chip, part number PIC16F690, manufactured and sold by Microchip Technology, Inc. of Chandler, Ariz., United States of America. However, any other type of microcontroller may be used instead.

Figure 6A:
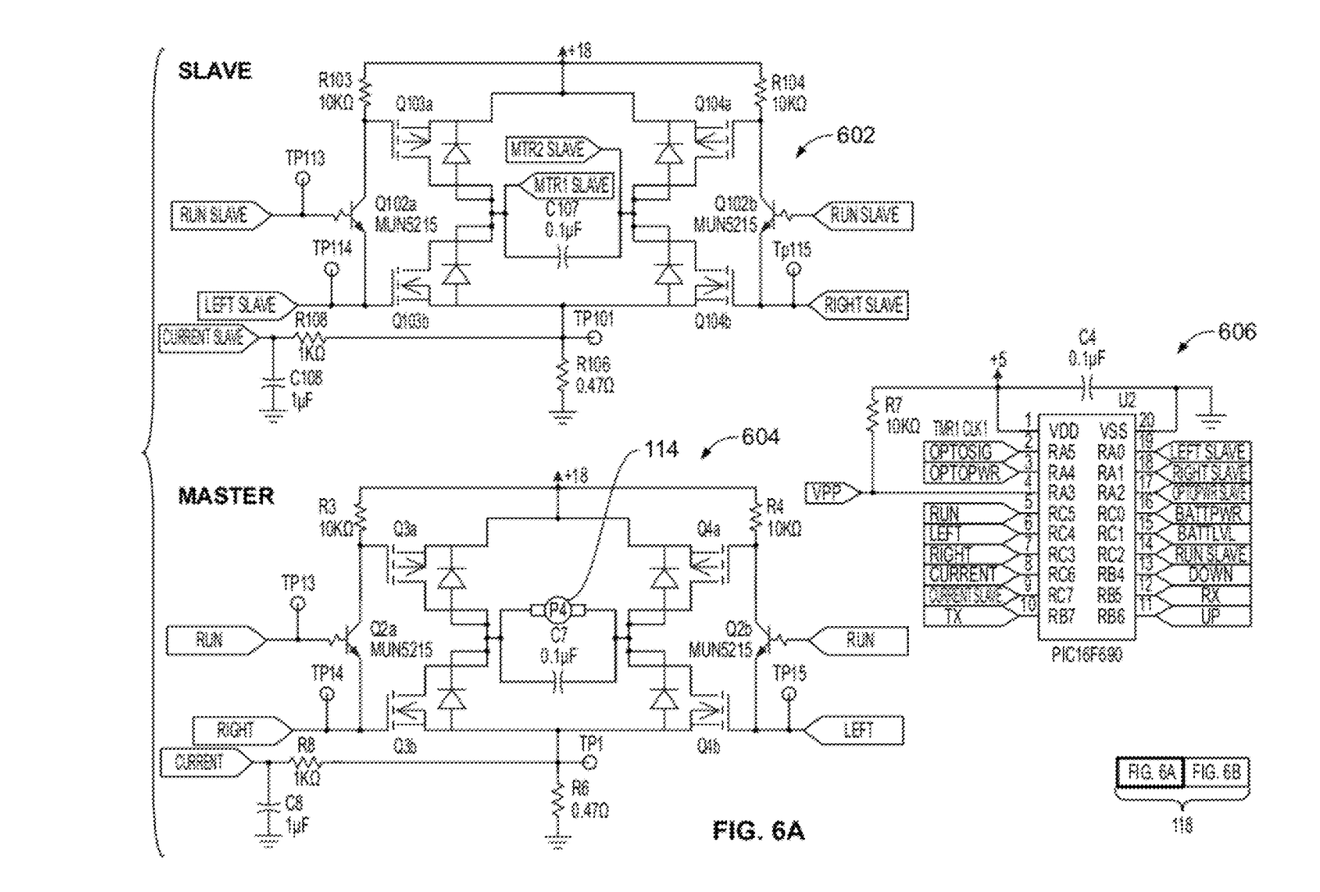
FIGS. 6A and 6B is a schematic diagram of example electrical circuitry to control a middle rail of the example architectural opening covering of FIGS. 1 and 2.

The programming header 412 of the illustrated example enables in-circuit programming of the PIC in-circuit programmable microcontroller chip of the controller circuit 410 and a PIC in-circuit programmable microcontroller chip of a controller circuit 606 of FIG. 6A.

The interconnect 414 of the illustrated example is used to communicatively couple the control circuit 108 to the control circuit 118.

In the illustrated example of FIGS. 4A and 4B, power supply lines are labeled as 'POWER', '+3.3V', 'VPP', 'GND', and 'IRPWR'. The power supply line 'POWER' represents electrical power provided by direct current (DC) batteries and/or a wall-powered alternating current (AC)-to-DC transformer. The power supply line '+3.3V' represents logic power regulated by the power regulator circuit 402 to power logic components. The power supply line 'GND' represents ground. The power supply line 'IRPWR' represents power delivered to the IR receiver circuit 406.

In the illustrated example of FIGS. 4A and 4B, control and data lines are labeled as 'SWITCH', 'IRSIG', 'ICSPDATA', 'ICSPCLK', 'IRQ', 'CSN', 'CE', 'SCK', 'MOSI', 'MISO', 'RX*', 'RX', 'TX', 'UP*', 'DOWN*', 'UP', and 'DOWN'. The 'SWITCH' line provides signals from the pushbutton switch circuit 404 to the controller circuit 410. The 'IRSIG' line provides electrical signals to the controller circuit 410 from the IR receiver circuit 406 corresponding to IR signals received by the IR receiver circuit 406. The 'IRSIG' signals code or represent the information received via IR from a remote control to indicate up and/or down commands. The 'ICSPDATA' and the 'ICSPCLK' lines provide data and clock signals, respectively, for in-circuit serial programming (ICSP) of the PIC microcontroller chip that implements the controller circuit 410.

The 'IRQ', 'CE', 'CSN', 'SCK', 'MOSI', and 'MISO' lines provide control and data signals for communications between the RF receiver circuit 408 of FIG. 4B and the controller circuit 410. The 'IRQ' line is used to provide an interrupt signal driven by the RF receiver circuit 408 when the RF receiver circuit 408 has data for the controller circuit 410. The 'CE' line provides a chip enable signal from the controller circuit 410 to the RF receiver circuit 408 to enable or disable the RF receiver circuit 408. The 'CSN' (i.e., chip select), 'SCK' (i.e., serial clock), 'MOSI' (i.e., master output/slave input), and 'MISO' (i.e., master input/slave output) lines form a serial peripheral interface (SPI) bus to communicate data between the RF receiver circuit 408 and the controller circuit 410. In the illustrated example, the RF receiver circuit 408 communicates data to the controller circuit 410 via the SPI bus that is indicative of up and/or down commands received at the RF receiver circuit 408 from an RF remote control.

The 'RX*', 'RX', and 'TX' lines enable communications between the controller circuit 410 and a controller circuit 606 of FIG. 6 located in the bottom rail 106.

The 'UP*', 'DOWN*', 'UP', and 'DOWN' lines provide control signals to cause upward and/or downward movements of the middle rail 104 and/or the bottom rail 106. The 'UP' and 'DOWN' signals are provided to the controller circuit 606 (FIG. 6) of the bottom rail 106 for further processing to cause the upward and/or downward movements by selectively enabling the master motor 114 and/or the slave motor 116 of FIGS. 1 and 2 based on detected positions of the middle rail 104 and the bottom rail 106.

Figure 5:
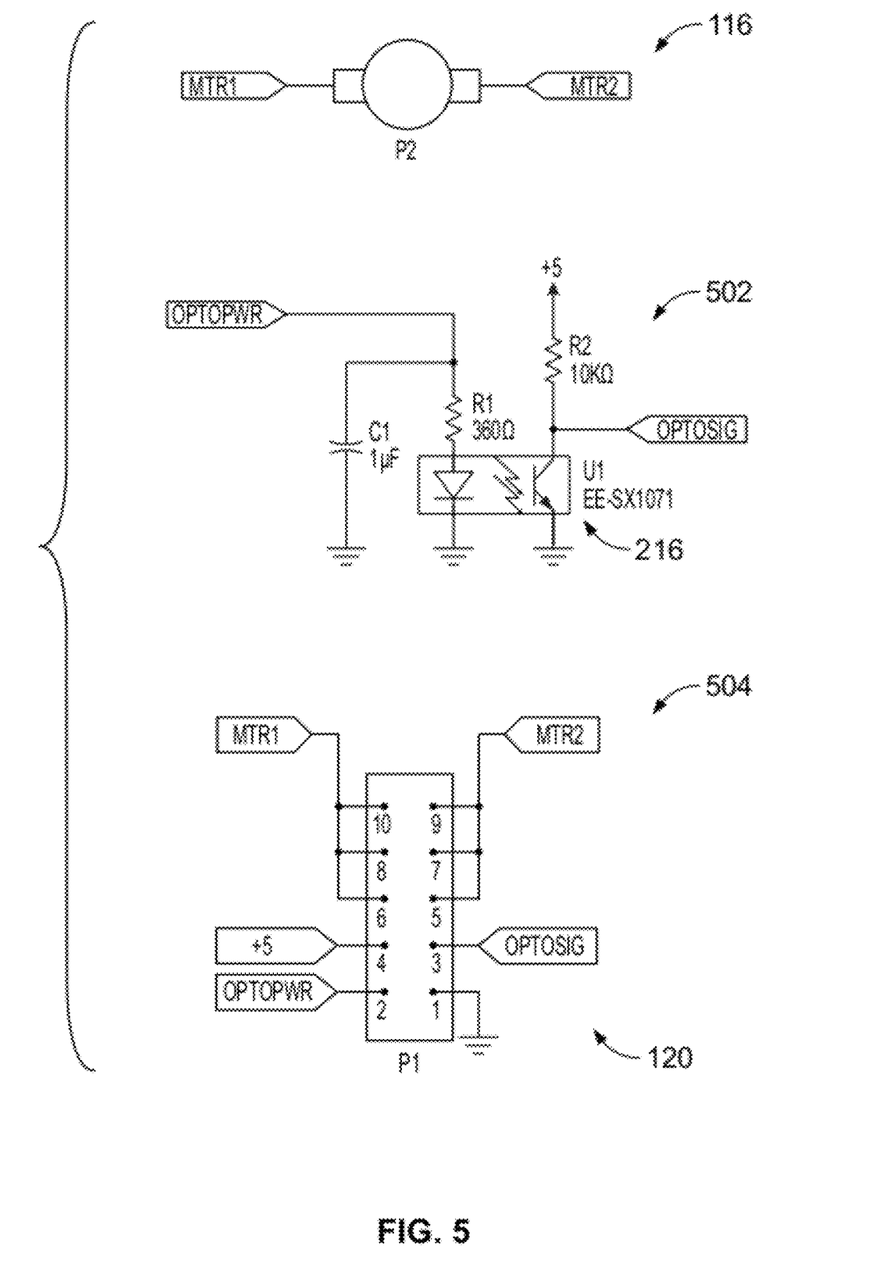
FIG. 5 is a schematic diagram of example electrical circuitry to control a bottom rail of the example architectural opening covering of FIGS. 1 and 2.

FIG. 5 depicts a schematic diagram of the example electrical circuitry (e.g., the control circuitry 120 of FIGS. 1 and 2) to control the bottom rail 106 of the example architectural opening covering system 100 of FIGS. 1 and 2. In the illustrated example, the control circuitry 120 includes the slave motor 116, an optical rotary encoder circuit 502, and an interconnect 504. The photo-sensor circuit 502 of the illustrated example implements the optical rotary encoder 228 of FIG. 2. The interconnect 504 of the illustrated example is used to communicatively couple the control circuitry 120 with the control circuitry 118 associated with the master motor 114.

In the illustrated example of FIG. 5, control and data lines are labeled as 'MTR1', 'MTR2', 'OPTOPWR', 'OPTOSIG', and '+5'. The 'MTR1' and 'MTR2' lines provide power to the slave motor 116 to selectively run the motor 116 in a forward direction or in a reverse direction, depending on whether the bottom rail 106 is to move upward or downward. The power for the 'MTR1' and 'MTR2' lines are provided by a slave motor control circuit 602 of FIG. 6A. In the illustrated example, the 'MTR1' line is connected to the motor power A conductor 202 of FIG. 2 and the 'MTR2' line is connected to the motor power B conductor 204 of FIG. 2.

As shown in the interconnect 504, each of the 'MTR1' and 'MTR2' lines requires three electrical conductors. In the illustrated example, three 24-AWG electrical conductors are required due to the amount of electrical current required to power the slave motor 116.

The 'OPTOPWR' line provides electrical power to the optical rotary encoder circuit 502, which implements the optical rotary encoder 228 of FIG. 2. The power for the 'OPTOPWR' line is provided by the controller circuit 606 of FIG. 6A. The 'OPTOSIG' line provides a photo-interruption signal from the optical rotary encoder circuit 502 to the controller circuit 606 of FIG. 6A to determine an end of upward travel of the bottom rail 106. In the illustrated example, the optical rotary encoder circuit 502 is implemented using a photomicrosensor (transmissive), part number EE-SX1071, manufactured and sold by OMRON Corporation of Shiokoji Horikawa, Shimogyo-ku, Kyoto 600-8530 Japan. However, any other suitable photo-sensor may be used.

Figure 6B:
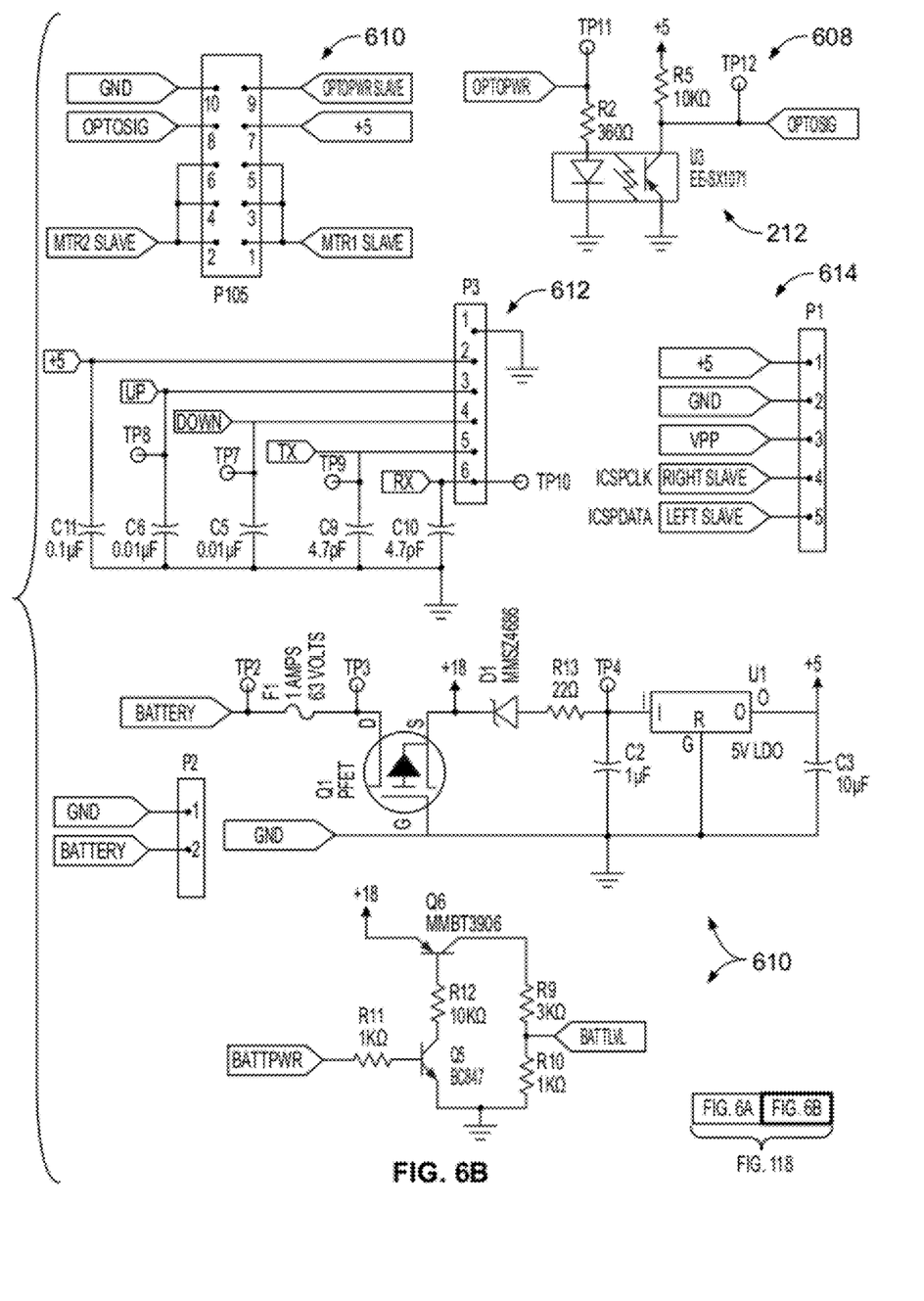

FIGS. 6A and 6B is a schematic diagram of example electrical circuitry (e.g., the control circuitry 118 of FIGS. 1 and 2) to control the middle rail 104 of the example architectural opening covering system 100 of FIGS. 1 and 2. In the illustrated example, the control circuitry 118 is provided with a slave motor control circuit 602, a master motor control circuit 604, a controller circuit 606, an optical rotary encoder circuit 608, power regulator circuits 610, and interconnect circuits 612, 614, and 616.

In the illustrated example, the slave motor control circuit 602 controls operation of the bottom rail motor 116 of FIGS. 1, 2, and 5. The master motor control circuit 604 of the illustrated example includes the master motor 114 and controls operation thereof.

In the illustrated example, the controller circuit 606 is provided to implement one or more control algorithms or processes to control the operations of the architectural opening covering system 100. In the illustrated example, the controller circuit 606 is implemented using a PIC in-circuit programmable microcontroller chip, part number PIC16F690, manufactured and sold by Microchip Technology, Inc. of Chandler, Ariz., United States of America. However, any other type of microcontroller may be used instead.

In the illustrated example, the optical rotary encoder circuit 608 implements the optical rotary encoder 226 of FIG. 2. In the illustrated example, the power regulator circuits 610 regulate and provide electrical power from a direct current (DC) battery to power the control circuitry 108, 118, and 120 of FIGS. 1, 2, 4A, 4B, 5, 6A, and 6B.

In the illustrated example of FIGS. 6A and 6B, control and data lines are labeled as 'RUN_SLAVE', 'LEFT_SLAVE', 'RIGHT_SLAVE', 'CURRENT_SLAVE', 'RUN', 'RIGHT', 'LEFT', 'CURRENT', 'OPTOSIG', 'OPTOPWR', 'VPP', 'RX', 'TX', 'UP', 'DOWN', 'OPTOPWR_SLAVE', 'MTR1_SLAVE', 'MTR2_SLAVE', 'BATTERY', 'BATTLVL', 'BATTPWR', AND 'GND'. For purposes of brevity, lines or signals corresponding to lines/signals appearing on FIG. 6A or 6B that have already been described above in connection with any of FIGS. 4A, 4B and/or 5 are not described again below.

In the illustrated example, the 'RUN_SLAVE', 'LEFT_SLAVE', and 'RIGHT_SLAVE' lines provide power and control signals to selectively operate the slave motor 116 of FIGS. 1, 2, and 5 in a forward direction or in a reverse direction. That is, powering the 'RUN_SLAVE' line and the 'LEFT_SLAVE' line while holding the 'RIGHT_SLAVE' line low (e.g., 0 volts) causes the slave motor 116 to rotate in a first direction (e.g., a forward direction). To cause the slave motor 116 to rotate in a second direction (e.g., a reverse direction) opposite the first direction, the 'RUN_SLAVE' line and the 'RIGHT_SLAVE' line are powered while the 'LEFT_SLAVE' line are held low (e.g., 0 volts).

The 'CURRENT_SLAVE' line of the illustrated example enables the controller circuit 606 to measure an electrical current consumption of the slave motor 116. In the illustrated example, the controller circuit 606 can use the measured electrical currents to determine positions (e.g., intermediate positions or end of travel positions) of the bottom rail 106. In some examples, the controller circuit 606 can also use the measured electrical currents to determine when the bottom rail 106 is being obstructed such that further operation would damage the slave motor 116. In this manner, the controller circuit 606 can stop powering the slave motor 116 to prevent damage thereto.

In the illustrated example, the 'RUN', 'RIGHT', 'LEFT', and 'CURRENT' lines correspond to the operation of the master motor 114 of FIGS. 1, 2, and 6A. Operations of the 'RUN', 'RIGHT', 'LEFT', and 'CURRENT' lines for the master motor 114 are substantially similar or identical to the operations of the 'RUN_SLAVE', 'LEFT_SLAVE', 'RIGHT_SLAVE', and 'CURRENT_SLAVE' lines, respectively.

The 'OPTOPWR_SLAVE' line of the illustrated example enables the controller circuit 606 to provide power to the optical rotary encoder circuit 608 of FIG. 6B.

The 'MTR1_SLAVE' and 'MTR2_SLAVE' lines of the illustrated example are connected to the 'MTR1' and 'MTR2' lines of the control circuitry 120 of FIG. 5 to power the slave motor 116 as shown in FIG. 5.

The 'BATTERY' line of the illustrated example connects one or more DC battery cells to provide DC voltage to the power regulators 610. In the illustrated example, the 'BATTPWR' and 'BATTLVL' lines are used to enable the controller circuit 608 to monitor the battery level or battery charge remaining in DC battery(ies) powering the architectural opening covering system 100.

Figure 7:
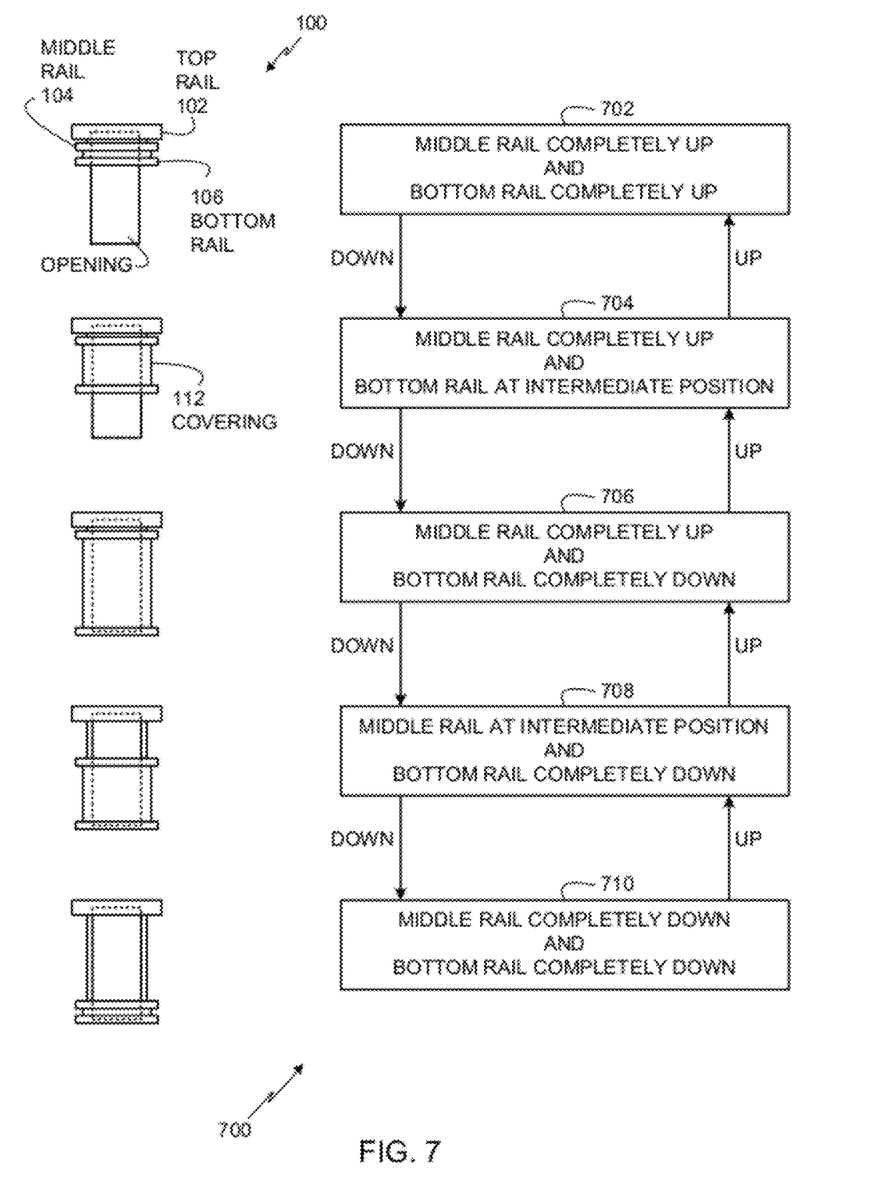
FIG. 7 depicts an example sequence flow diagram representative of retraction and extension operations of the middle and bottom rails of the example architectural opening covering of FIGS. 1 and 2.

FIG. 7 depicts an example sequence flow diagram 700 representative of retraction and extension operations of the middle rail 104 and the bottom rail 106 of the example architectural opening covering system 100 of FIGS. 1 and 2. The example sequence flow diagram 700 is representative of one or more example processes that may be implemented using, for example, computer readable instructions stored on a computer-readable medium to operate the architectural opening covering system 100. Such example processes of FIG. 7 may be performed using one or more processors, controllers, and/or any other suitable processing devices. For example, the example processes of FIG. 7 may be implemented using coded instructions (e.g., computer readable instructions) stored on one or more tangible computer readable media such as flash memory, read-only memory (ROM), and/or random-access memory (RAM). As used herein, the term tangible computer readable medium is expressly defined to include any type of computer readable storage and to exclude propagating signals. Additionally or alternatively, the example processes of FIG. 7 may be implemented using coded instructions (e.g., computer readable instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIG. 7 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 7 may be implemented manually or as any combination(s) of any of the foregoing techniques, for example, any combination of firmware, software, discrete logic and/or hardware. Further, although the example processes of FIG. 7 are described with reference to the flow diagram of FIG. 7, other methods of implementing the processes of FIG. 7 may be employed. For example, the order of execution of the blocks may be changed, and/or some of the blocks described may be changed, eliminated, sub-divided, or combined. Additionally, any or all of the example processes of FIG. 7 may be performed sequentially and/or in parallel by, for example, separate processing threads, processors, devices, discrete logic, circuits, etc.

In the illustrated example of FIG. 7, the different positions of the middle rail 104 and the bottom rail 106 are represented at different stages or states enumerated as states 702, 704, 706, 708, and 710. Shown between each state is a down indicator ('DOWN') and an up indicator ('UP'). The down indicator indicates that a down control signal has been received (e.g., due to a user pressing a down button on a remote control or on a control panel of the top rail 102), and the up indicator indicates that an up control signal has been received (e.g., due to a user pressing an up button on a remote control or on a control panel of the top rail 102). Also shown in the illustrated example are thumbnail representations of the architectural opening covering system 100. Each of the thumbnail representations corresponds to a respective one of the enumerated states 702, 704, 706, 708, and 710 to show positions of the middle rail 104 and the bottom rail 106 for each corresponding state.

An example state 702 represents a condition in which the middle rail 104 is completely up (e.g., at an upward end-of-travel position at which the middle rail 104 is in abutment with the top rail 102) and the bottom rail 106 is completely up (e.g., an upward end-of-travel position at which the bottom rail 106 is in abutment with the middle rail 104).

When a down control signal is received during the example state 702, the architectural opening covering system 100 transitions to state 704 at which the middle rail 104 remains in the completely up position and the bottom rail 106 moves to an intermediate position (e.g., a position that is not completely up nor completely down). However, when an up control signal is received during the example state 702, the middle rail 104 and the bottom rail 106 do not move, but instead remain in their completely up positions.

When an up control signal is received during the example state 704, the architectural opening covering system 100 transitions back to state 702. However, when a down control signal is received during the example state 704, the architectural opening covering system 100 transitions to state 706 at which the middle rail remains in the completely up position and the bottom rail 106 moves to a completely down position (e.g., a downward end-of-travel position at which the bottom rail 106 is furthest away from the top rail 102).

When an up control signal is received during the example state 706, the architectural opening covering system 100 transitions back to state 704. However, when a down control signal is received during the example state 706, the architectural opening covering system 100 transitions to state 708 at which the middle rail 104 moves to an intermediate position (e.g., a position that is not completely up nor completely down) and the bottom rail 106 remains in the completely down position.

When an up control signal is received during the example state 708, the architectural opening covering system 100 transitions back to state 706. However, when a down control signal is received during the example state 708, the architectural opening covering system 100 transitions to state 710 at which the middle rail 104 is moved to a completely down position (e.g., a downward end-of-travel position at which the middle rail 104 is in abutment with the bottom rail 106) and the bottom rail 106 remains in the completely down position.

When an up control signal is received during the example state 710, the architectural opening covering system 100 transitions back to state 708. However, when a down control signal is received during the example state 710, the middle rail 104 and the bottom rail 106 do not move, but instead remain in their completely down positions.

In some examples, the architectural opening covering system 100 causes the middle rail 104 and/or the bottom rail 106 to bypass (e.g., not stop at) intermediate positions when a user presses and holds a 'down' button or an 'up' button (e.g., on a remote control) for extended durations to generate corresponding extended-duration down and up control signals. For example, an extended-duration down signal at state 702 causes the architectural opening covering system 100 to transition from state 702 to state 706, bypassing state 704. In this manner, the bottom rail 106 moves from the completely up position of state 702 to the completely down position of state 706 without stopping at (e.g., bypassing) the intermediate position of state 704. An extended-duration down signal at state 706 of the illustrated example causes the architectural opening covering system 100 to transition from state 706 to state 710, bypassing state 708. In this manner, the middle rail 104 moves from the completely up position of state 706 to the completely down position of state 710 without stopping at (e.g., bypassing) the intermediate position of state 708. An extended-duration up signal at state 710 of the illustrated example causes the architectural opening covering system 100 to transition from state 710 to state 706, bypassing state 708. In this manner, the middle rail 104 moves from the completely down position of state 710 to the completely up position of state 706 without stopping at (e.g., bypassing) the intermediate position of state 708. An extended-duration up signal at state 706 causes the architectural opening covering system 100 to transition from state 706 to state 702, bypassing state 704. In this manner, the bottom rail 106 moves from the completely down position of state 706 to the completely up position of state 702 without stopping at (e.g., bypassing) the intermediate position of state 704.

Although certain states 702, 704, 706, 708, and 710 and corresponding thumbnail representations have been provided, these states and/or corresponding positions are illustrative and are not meant to be exhaustive of all possible states and/or positions of the covering. On the contrary, other intermediary states may occur.

Although certain methods, apparatus, and articles of manufacture have been described herein, the scope of coverage of this patent is not limited thereto. To the contrary, this patent covers all methods, apparatus, and articles of manufacture fairly falling within the scope of the claims either literally or under the doctrine of equivalents.

What is claimed is:

1. An architectural opening covering system to be used to cover an architectural opening, comprising:
    a first motor to move a middle rail relative to a fixed top rail;
    a second motor to move a bottom rail relative to the middle rail and the fixed top rail;
    a covering between the middle rail and the bottom rail, a first movement of the middle rail relative to the fixed top rail to retract the covering to expose the architectural opening between the middle rail and the fixed top rail, a second movement of the middle rail relative to the fixed top rail to cover the architectural opening between the middle rail and the bottom rail; and
    a controller to selectively actuate the first motor to move the middle rail based on a first position of the middle rail and a first position of the bottom rail, and to selectively actuate the second motor to move the bottom rail based on a second position of the middle rail and a second position of the bottom rail.

2. A system as defined in claim 1, further including an optical rotary encoder to detect an upward end-of-travel position of the middle rail.

3. A system as defined in claim 1, wherein when the first position of the middle rail is an upward end-of-travel position of the middle rail, the controller is responsive to a first input signal to selectively actuate the first motor to move the middle rail downward either to an intermediate position of the middle rail or to a downward end-of-travel position of the middle rail.

4. A system as defined in claim 3, wherein when the first position of the middle rail is the downward end-of-travel position of the middle rail, the controller is responsive to a second input signal to selectively actuate the first motor to move the middle rail upward either to the intermediate position of the middle rail or to the upward end-of-travel position of the middle rail.

5. A system as defined in claim 4, wherein when the second position of the bottom rail is an upward end-of-travel position of the bottom rail, the controller is responsive to a third input signal to selectively actuate the second motor to move the bottom rail downward either to an intermediate position of the bottom rail or to a downward end-of-travel position of the bottom rail.

6. A system as defined in claim 5, wherein when the second position of the bottom rail is the downward end-of-travel position of the bottom rail, the controller is responsive to a fourth input signal to selectively actuate the second motor to move the bottom rail upward either to the intermediate position of the bottom rail or to the upward end-of-travel position of the bottom rail.

7. A system as defined in claim 1, wherein the controller is to determine a maximum upward position and a maximum downward position of the middle rail based on measurements of electrical current drawn by the first motor.

8. A system as defined in claim 7, further including a rotary encoder, wherein the controller is to determine the maximum upward position by associating a first electrical current measurement with a first rotary encoder reading from the rotary encoder and to determine the maximum downward position by associating a second electrical current measurement with a second rotary encoder reading from the rotary encoder.

9. A system as defined in claim 1, further including a ribbon cable to provide communications between the second motor and the controller.

10. A system as defined in claim 1, wherein the first and second motors are located in the top rail.

11. A system as defined in claim 1, further including a first motor control circuit, and a second motor control circuit.

12. A method to control an architectural opening covering system to be used to cover an architectural opening, comprising:
    selectively actuating a first motor to move a middle rail based on a first position of the middle rail and a first position of a bottom rail to extend or retract a covering positioned between the middle rail and the bottom rail; and
    selectively actuating a second motor to move the bottom rail based on a second position of the middle rail and a second position of the bottom rail, a first movement of the middle rail relative to the bottom rail to retract the covering between the middle rail and the bottom rail to expose the architectural opening between the middle rail and a top rail, a second movement of the middle rail relative to the bottom rail to extend the covering between the middle rail and the bottom rail to cover the architectural opening with the covering extending between the middle rail and the bottom rail.

13. A method as defined in claim 12, wherein when the first position of the middle rail is an upward end-of-travel position of the middle rail, the selective actuation of the first motor causes the middle rail to move downward either to an intermediate position of the middle rail or to a downward end-of-travel position of the middle rail.

14. A method as defined in claim 13, further including using an optical rotary encoder to detect the upward end-of-travel position of the middle rail.

15. A method as defined in claim 13, wherein when the first position of the middle rail is the downward end-of-travel position of the middle rail, the selective actuation of the first motor causes the middle rail to move upward either to the intermediate position of the middle rail or to the upward end-of-travel position of the middle rail.

16. A method as defined in claim 15, wherein when the second position of the bottom rail is an upward end-of-travel position of the bottom rail, the selective actuation of the second motor causes the bottom rail to move downward either to an intermediate position of the bottom rail or to a downward end-of-travel position of the bottom rail.

17. A method as defined in claim 16, wherein when the second position of the bottom rail is the downward end-of-travel position of the bottom rail, the selective actuation of the second motor causes the bottom rail to move upward either to the intermediate position of the bottom rail or to the upward end-of-travel position of the bottom rail.

18. A method as defined in claim 12, further including determining a maximum upward position and a maximum downward position of the middle rail based on measurements of electrical current drawn by the first motor.

19. A method as defined in claim 18, further including:
determining the maximum upward position of the middle rail by associating a first electrical current measurement with a first rotary encoder reading from a rotary encoder; and
determining the maximum downward position of the middle rail by associating a second electrical current measurement with a second rotary encoder reading from the rotary encoder.

20. A non-transitory computer readable medium comprising instructions to cause a machine to at least:
selectively actuate a first motor to move a middle rail based on a first position of the middle rail and a first position of a bottom rail to extend or retract a covering positioned between the middle rail and the bottom rail; and
selectively actuate a second motor to move the bottom rail based on a second position of the middle rail and a second position of the bottom rail, a first movement of the middle rail relative to the bottom rail to retract the covering between the middle rail and the bottom rail to expose an architectural opening between the middle rail and a top rail, a second movement of the middle rail relative to the bottom rail to extend the covering between the middle rail and the bottom rail to cover the architectural opening with the covering.

\* \* \* \* \*